Aug. 25, 1942.  C. L. MILLER  2,294,195
DISTANCE MEASURING DEVICE
Filed March 15, 1940  3 Sheets-Sheet 1

INVENTOR.
CLAUDE L. MILLER
BY
Cook + Robinson.
ATTORNEY.

Aug. 25, 1942.  C. L. MILLER  2,294,195
DISTANCE MEASURING DEVICE
Filed March 15, 1940  3 Sheets-Sheet 2
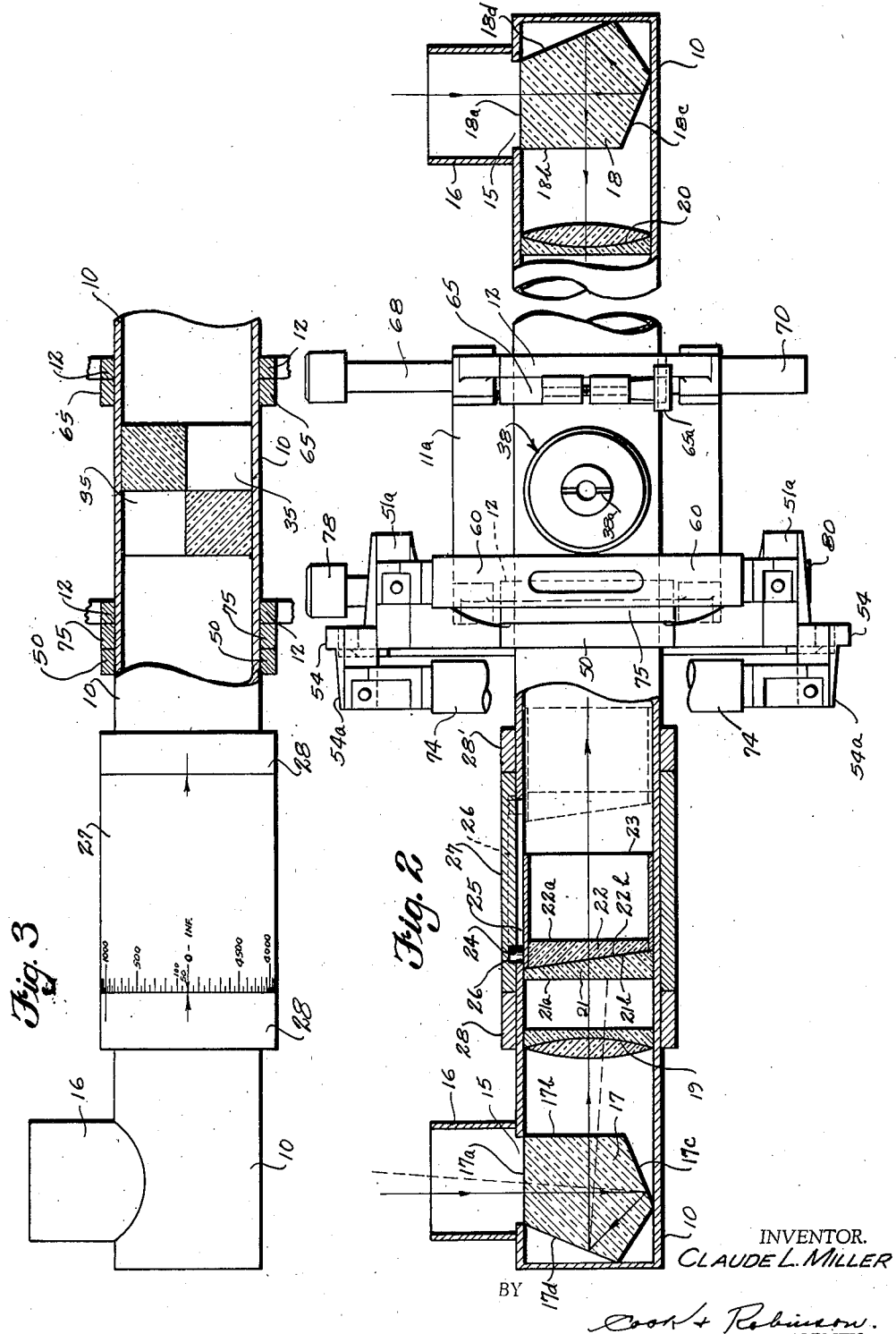
INVENTOR.
CLAUDE L. MILLER
BY
Cook + Robinson
ATTORNEY.

Aug. 25, 1942.  C. L. MILLER  2,294,195
DISTANCE MEASURING DEVICE
Filed March 15, 1940   3 Sheets-Sheet 3
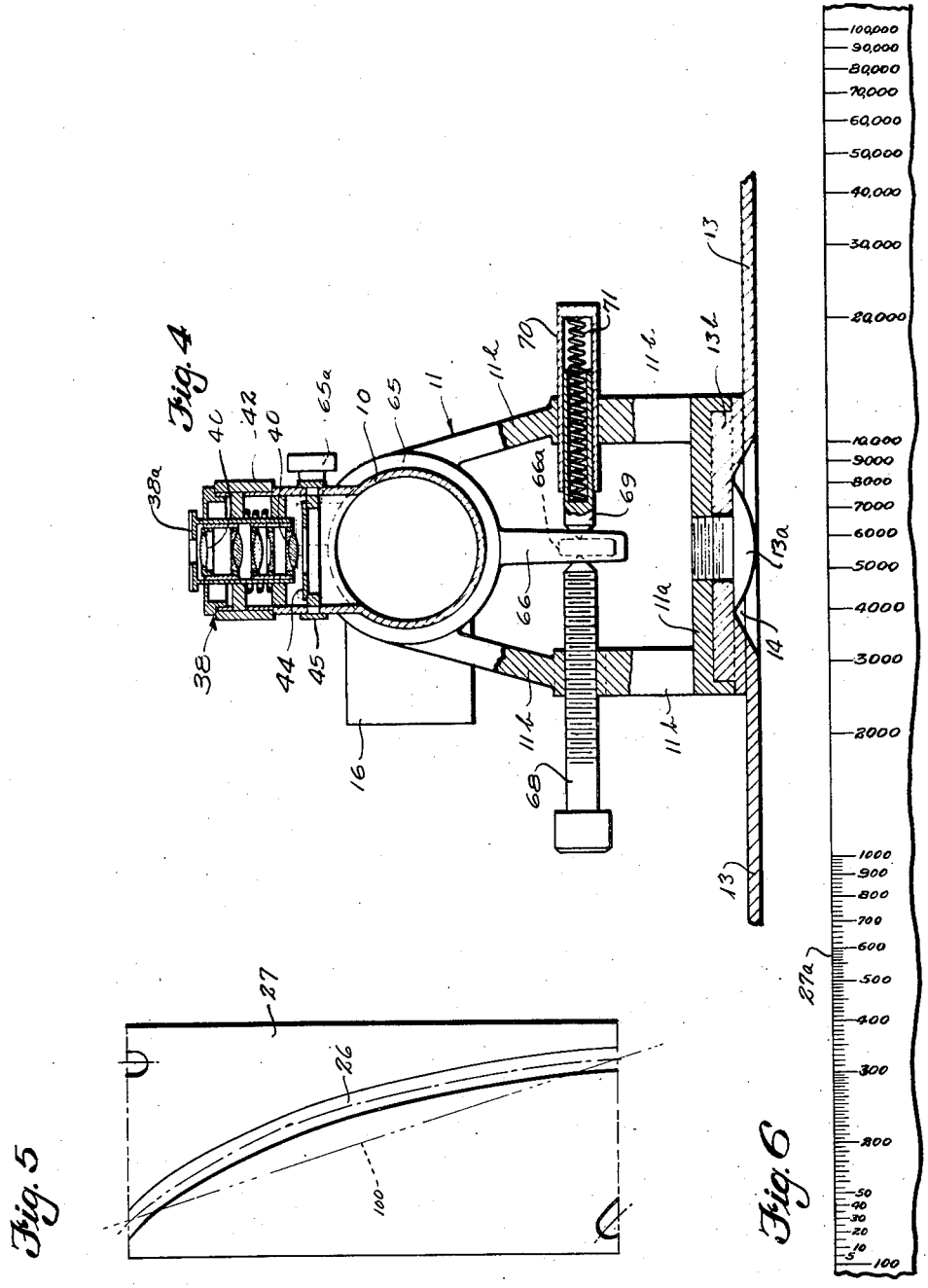
INVENTOR.
CLAUDE L. MILLER
BY
Cook & Robinson.
ATTORNEY.

Patented Aug. 25, 1942

2,294,195

UNITED STATES PATENT OFFICE 2,294,195

DISTANCE MEASURING DEVICE

Claude L. Miller, Seattle, Wash.

Application March 15, 1940, Serial No. 324,126

3 Claims. (Cl. 88—2.7)

This invention relates to surveying instruments, and has reference more particularly to an instrument which I call an alidade, of which certain parts embodied in its structure are similar to, or may be compared to a present-day alidade, and of which certain other parts are similar to or may be compared to a range finder.

More specifically stated, this invention relates to a surveyor's alidade which makes it possible to sight a distant object through a lens and prism system and determine its exact distance from the observer, its horizontal distance from the observer, and also its elevation from the observer.

Explanatory to the present invention, it will here be stated that in the past, in surveying or mapping a given area, it was necessary for a surveyor to send a man to a distant point, sometimes on dangerously inaccessible mountain sides, peaks or cliffs, and then observe or sight upon a leveling or stadia rod, to obtain the measurements and angles of elevation or depression necessary for such surveying or mapping. It has also been necessary, as a part of the surveying procedure, to sight upon a point from two or more locations to ascertain relative positions, as is well understood in the art.

In view of the long and exacting procedure now necessary in the routine of surveying, it has been the principal object of this invention to provide a surveying instrument that will simplify such tedious routine in cursory surveying, making the task much simpler, easier, quicker and less expensive, as well as eliminating the hazardous or dangerous climbing, by either the surveyor or his assistants.

Briefly stated, a further object has been to provide a surveying instrument, or alidade, whereby the readings obtained would be resolved directly by the instrument itself into the linear distance from the observer to the object or point observed, and also at the same time give the horizontal and vertical distances of the triangle, as well as the angles of the triangle, if desired.

It is a still further object of this invention to provide a surveying instrument that will eliminate some and simplify other of the mathematical calculations or computations, thereby rendering a greater accuracy or eliminating a possibility of error.

Still further objects of the invention reside in the combination of parts, their construction, use and mode of operation, as will hereinafter be fully described.

In accomplishing these and other objects of the invention, I have provided the improved details of construction, the preferred forms of which are illustrated in the accompanying drawings, wherein—

Fig. 2 is a plan view of the same, shown in partial section for better illustration.

Fig. 3 is a top, or plan view of the sighting tube, particularly illustrating the graduated ring, and showing, through cross section, the ocular prism therein.

Fig. 4 is a central, vertical cross section, showing in detail the magnifying eyepiece, and the tangent adjustment mechanism.

Fig. 5 is a development of the graduated ring, particularly illustrating the curved groove in the inside thereof.

Fig. 6 is a development of a collar of alternative construction, showing the graduations conforming to a logarithmic scale which will be used with a straight or uniform curve incorporated in the collar.

Figure 1:
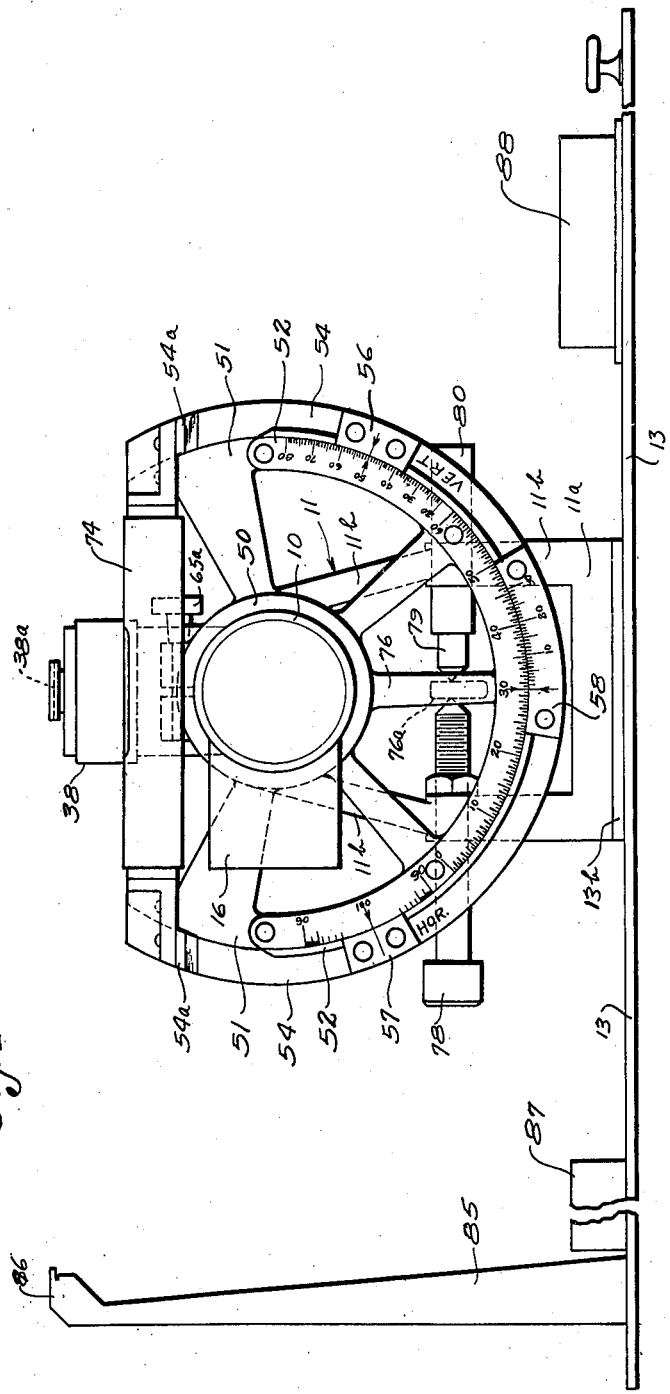
Fig. 1 is a side elevation of a surveying alidade embodying the present invention.

Briefly described, this invention comprises a cylindrical sighting tube, which is mounted by a standard on a horizontal blade of rectangular shape; upon said blade there being mounted a compass, a sealed spirit level, and a sighting post. The sighting tube is axially rotatable in the standard, and is equipped with a graduated stadia arc, with pointers and vernier mounted on the standard. Penta-prisms are mounted in each end of the sighting tube, and disposed to reflect the beams of light at an angle of 90° from the object observed toward central portion thereof, where an ocular prism reflects these beams of light upwardly through a vertical eyepiece, which is mounted on the sighting tube above the ocular prism.

Referring more in detail to the drawings—

Reference numeral 10 designates a cylindrical tube of substantial length, which is rotatably mounted in a standard 11. The standard 11 comprises a square base portion 11a with posts 11b extending upwardly from the four corners thereof with the paired posts at opposite sides converging to spaced ring mountings 12, axially alined and within which the tube 10 is rotatably mounted. The standard 11 is removably fixed on a blade or plane table blade 13 by a bolt 13a, and it will be noted by reference to Fig. 4, that a mounting block 13b is fixed to the blade 13, and that the round head of the bolt 13a is seated in a recess 14 in the under side of the blade, thus providing that the latter may seat flatly and evenly upon a flat supporting surface.

By reference to Fig. 2, it will be seen that in the forwardly facing side wall of the sighting tube 10 and adjacent the ends thereof, ports or holes 15 are provided, and these are equipped with hoods or sunshades 16.

Disposed in opposite ends of the tube 10, opposite the ports 15, are penta-prisms 17 and 18. These penta-prisms are alike in formation of all faces, but are reversed with reference to direction of light reflection. Each prism has a forward face in a plane parallel with the tube axis; an inside face in a plane perpendicular to the axis of the tube, an outside face at an angle with respect to the axis of the tube, and a back face at such angle relative to the outside face that light entering through the front opening will be reflected substantially parallel with the tube axis toward the opposite end of the tube. The forward faces, 17a and 18a, respectively, lie in the same vertical plane, and their inside, or facing surfaces, 17b and 18b, are in vertical, parallel planes. Thus, light is reflected at an angle of 90°, entering the prisms through their front surfaces 17a and 18a, and is reflected by the angular back faces 17c and 18c, to the end faces 17d and 18d, respectively, and then reflected by the latter faces through the faces 17b and 18b toward the ocular prism located at the center of the sighting tube, as presently described.

In opposite end portions of the tube 10, spaced inwardly somewhat from the penta-prisms 17 and 18, are objective lenses 19 and 20, of at least the usual high anastigmatic or achromatic optical quality.

In one side, or arm of the sighting tube 10, are two measuring or correcting prisms 21 and 22. These measuring prisms are wedge-shaped and have outer faces 21a and 22a, respectively, in parallel planes, and also parallel to the faces 17b and 18b of the penta-prisms 17 and 18. The inner faces, 21b and 22b, are in vertical, parallel planes at an angle to the faces 21a and 22a, and it will be noted that these prisms are set complementary to each other. It will also be noted that the prism 21 is fixedly mounted in the sighting tube 10 and that the prism 22 is fixedly mounted in a movable draw sleeve 23. At one end of this draw sleeve, a pin 24 extends therefrom through a slot 25 in the sighting tube, which allows the draw tube 23 to be moved axially within the sight tube 10, but prevents it from being rotated therein. This pin 24 is disposed within a curved slot or groove 26 in a sleeve 27 which is rotatably disposed about a tube 10. At the ends of the rotatable sleeve 27, collars 28 and 28' are fixed on tube 10, which provide that the sleeve 27 may be rotated so as to move the draw tube 23 through the stud connection 24, but without endwise movement of the sleeve 27 on the tube 10. The slot 26 in the sleeve 27 must naturally conform to a predetermined curved path; the type of curve and its significance being subsequently explained.

With reference to Figs. 2 and 3: It will be noted that the collars 28 and 28' are in close abutment with the sleeve 27, but certain provisions for adjustment in the two collars 28 and 28' may be incorporated in the construction so as to insure correct readings at all times. The slot 26 in the rotatable sleeve 27 is of a curved path, and is laid out according to a very accurate and specific formula; namely, a logarithm curve. Those familiar with the mathematics of logarithms and also slide rules, will have a thorough knowledge of this point of construction. Therefore it is thought unnecessary to go further into an explanation thereof.

With reference to Fig. 3, it will be noted that an ocular prism 35 is disposed directly beneath the eye piece which is designated at 38; this ocular prism comprising two oppositely facing elements that will split or divide the image vertically into two parts. The eye piece, shown in detail in Fig. 4, comprises a plurality of high optical quality objective lenses 40, which may be focused by manipulation of a ring 42. This eye piece may be of optional magnifying, such as a twenty or forty power magnification, or may be made interchangeable so that eye pieces of various magnification powers may be used. Below the objective lenses 40 in the eyepiece 38, is a cross hair reticle 44, which may be adjusted by a ring 45 to aid in properly centering the object focused upon.

At one side of the mounting ring 12 is disposed a collar 50, which mounts a circular shaped segment 51, upon which is mounted a graduated scale or stadia arc 52, and about the segment, a semi-circular bracket 54 is adjustably mounted, and upon which are fixed the plates 56, 57 and 58, marked with the reading arrows and the graduated vernier.

Mounted on the segment 51, above the sighting tube 10, at one side of the eye piece, is a sealed spirit level 60. This level 60 is fixedly mounted on inturned shoulders 51a of the segment, as seen in Fig. 2. At the opposite side of the eye piece, there is provided what is known as a tangent adjustment. This comprises a split clamp ring 65, which embraces the tube 10 adjacent to the mounting ring 12, and is provided across the joint with a locking screw 65a so that the ring may be locked to or released from the tube 10 by tightening or loosening the screw 65a. A bar 66, integral with the ring 65, as seen in Fig. 4, is disposed in a downward direction therefrom and has a web 66a extending therefrom between an adjusting screw 68 and a spring mounted plunger 69. This plunger 69 is movable in a plunger housing 70, and it will be noted that a spring 71 is disposed in a central bore in the plunger 69, so as to urge it outwardly. It will be noted that the adjusting screw 68 and the plunger housing 70 are disposed in two opposite legs 11b of the standard 11.

Mounted on the bracket 54 is a sealed spirit level 74, identical to the level 60, and fixedly mounted upon outturned ears 54a of the bracket 54. The bracket 54 may be rotatably mounted on the tube 10, and may be provided with an adjustment means similar to that provided for the tube 10 with the exception of the locking nut 65a, and comprises a ring 75, rotatable upon the tube 10 between the ring 50 and the ring 12, at that side of the instrument; it being understood that the bracket 54 is supported by spokes or bars similar to the bracket 54. A downwardly disposed bar 76, integral with the ring 75, has a web 76A extending therefrom between an adjustment screw 78 and a spring mounted plunger 79. This plunger 79 is movable in a plunger housing 80 which is provided with an internal spring therein in the same manner as the plunger housing 70, as seen in Fig. 4.

By such means the bracket 54 may be brought to an exact level for each reading, regardless of whether or not the table upon which the instrument is disposed is absolutely level. This is of importance because of the necessity of accuracy of the readings of angles of elevation between a true and accurate level and the angle of inclination or depression of the line of sight. It is also important since the instrument will be used in all directions from the board or table upon which it is disposed, and it is obvious that this board or table may be level in one plane or direction and not in the other, thereby effecting the accuracy of the readings accordingly.

The blade 13 is rectangular in shape, being of a substantial length, and mounts at its forward end a sighting post 85, having a sight 86 disposed at its upper end, and in direct alignment with a groove or notch 38a in the eyepiece 38. Also, mounted on the forward end of the blade 13, is a surveyor's compass 87 and, on the rearward end of the blade, a sealed circular spirit level 88.

It is also contemplated that such an instrument may be made in various sizes, depending upon the distances which are to be read or measured; it being obvious that for greater distances, a longer base range finder is more accurate. Therefore, it is contemplated that a larger instrument shall be made for longer or greater distances, so as to be of sufficient accuracy, or that a larger instrument may be made for greater accuracy even for shorter distances. It is also possible to use a straight or uniform curve for the slot in the rotatable sleeve; this necessitating a variation in the distances of graduations or calibrations on the sleeve, which would, of course, take the form of logarithmic scale variations. These calibrations, in all instruments, may be either on the stationary collar or on the rotatable sleeve with the actuating slot therein, with a marker or arrow on the opposite collar, opposite which the reading appears. The most convenient and desirable construction is to place the graduations on the rotatable sleeve.

Fig. 6 illustrates a portion of the development of a sleeve similar, of course, to the sleeve 27 upon which the graduations are not uniformly spaced, but are varied in their spacings according to the logarithmic curve or scale. In this case, the slot in the sleeve would be a straight line, as is the center line 100 in Fig. 5. This gives a uniform motion, advancement or retraction, of the movable correcting prism within the sight tube.

It will be here stated that the partial sleeve development, illustrated in Fig. 6, is for a larger instrument; for instance, one having a sight tube approximately 24 inches long and of a diameter of approximately 3 inches.

Assuming the device to be so constructed its operation would be as follows:

With the board set up on the tripod, as is the usual procedure in surveying, and the instrument disposed thereon, and it being desired to obtain all the necessary readings for surveying, the board is brought to as near a level condition or position as is possible with the tripod adjustments, with the aid of the circular level 88. Then, before each reading is taken, the level 74 is checked to make sure that the readings are taken from a true level. Should the level 74 indicate that a true level condition does not exist, the adjustment screw 78 is turned one way or the other, so as to bring this level to a true horizontal or level position.

The next step is to point the instrument in the general direction required, sighting through the notch 38a in the eye piece 38 and across the sight 86 on the post 85. This merely gives the general direction, and the final setting is made by sighting through the tube on the point or object. The object viewed will, of course, appear as a split image due to the ocular prism 35.

It is obvious that the farther away is the object sighted upon, the nearer parallel, or the smaller will be the angle between the rays of light entering the faces 17a and 18a of the penta-prisms 17 and 18; and likewise, the closer the object sighted upon, the greater will be this angle. As previously stated, the correcting prism 21 is fixed or stationary, while the correcting prism 22 is adjustably movable; the farther away the object sighted upon is, the closer the prism 22 will be to the prism 21, and, likewise, the closer the object sighted upon, the farther away the prism 22 will be from the prism 21. The maximum distance the prism 22 moves will, of course, depend upon the optical specifications of these two prisms, depending on their refractive index, or power to bend the ray of light, and the angle of their angularly complementary faces.

For illustration, it is considered that the prism 22 will be movable from its full line position to its dotted outline position, as seen in Fig. 2, incident to one rotation of the sleeve 27.

It will be here stated that the greater the distance between the two penta-prisms 17 and 18, the greater is the accuracy. This instrument illustrated has been designed to cover distances less than 5,000 feet, and, by adjustment of the sleeve 27, the two halves of the images are brought into exact alinement or coincidence, and the distance read on the sleeve 27 opposite the arrow on the fixed collar 28.

Rays of light have been illustrated in Fig. 2 in solid lines, as entering the penta-prisms 17 and 18, and these are shown as being substantially parallel, and therefore are reflected toward the ocular prism substantially along the axial line of the tube. This, of course, would be a maximum distance, or a 5,000 or infinity reading, and the degree of correction done by the prisms 21 and 22 is here at the minimum. Illustrated in dotted line is a ray of light coming from an object somewhat less than 5,000 feet, and which will be reflected to the prism 21 by the prism 17, and being magnified somewhat by the objective lens 19. Now, the prism 22 must be moved, so that this ray is directed substantially axially of the tube to the ocular prism 35, thereby causing the split image produced thereby to perfectly coincide; the distance of the object being read on the sleeve 27.

It is obvious that as the object sighted upon gets closer, the angle to the prisms 17 and 18 increases. This angle does not increase regularly or proportionately with reference to the distance, but increases according to a logarithmic curve; so, to maintain uniform graduations in the calibrating of the distances on the sleeve 27, I have illustrated the slot 26 as conforming to a log curve.

If the object sighted upon is above or below the level of the instrument, the vertical and horizontal distances are read from the arc 52 in conjunction with the plates 56 and 57. It is to be understood that in sighting upon an object that is above or below the level of the instrument, the distance read on the sleeve 27 is the hypotenuse of a triangle, the base and the arm of which are the horizontal and vertical distances, and will now be explained.

With reference to Fig. 1, it will be seen that the stadia arc 52 is calibrated from 0 to 60 opposite the plate 58, which are degree calibrations; the 30° calibration falling opposite the arrow thereon when in a level position, and that a vernier is provided thereon. In sighting on an object below the instrument, the angle read will be less than 30°, and if the object sighted upon is above the instrument, the angle read will be greater than 30°.

Also, opposite the plate 56, the arc 52 is provided with calibrations from 20 to 80, the midpoint 50 falling opposite the arrow thereon when in a level position, and opposite the plate 57 the arc 52 is provided with calibrations; 100 being opposite the arrow thereon, and calibrations from 100 to 90 being provided in both directions therefrom according to a log curve.

As an example, should the instrument be sighted in an upward direction upon a point which the straight line reading indicates as being 5,268 feet, and should the arc 52 then be in a position at which a reading taken thereon at the left-hand end as seen in Fig. 1 at the arrow mark on plate 57, be 3.358, this will indicate that for each 100 feet of straight line distance to the point, a correction of 3.358 feet must be made to give the distance of the point on the horizontal line. Thus the total correction will be approximately 177 feet, and this subtracted from 5,268, will give the horizontal distance as 5,091 feet. If it is desired to ascertain the vertical distance, it will be observed that the reading on the arc 52 opposite the arrow mark on plate 56 will be 74.315, and this is the correction for each 100 feet of straight line distance to obtain the vertical elevation of the mark, and this will be 52.68 multiplied by 74.315, or approximately 3,915, which subtracted from 5,268 will give the vertical distance as 1,353. The readings at the arrow marks on plates 57 and 56 may be considered as percentages since they designate the correction for each 100 feet of the straight line distance.

With reference to Fig. 6, it will now be explained that it is contemplated that, in one form of construction, the sleeve 27a may be approximately three inches in diameter, providing substantially a ten-inch circumference, and may be provided with graduations or calibrations as illustrated in Fig. 6. It will be noted that these calibrations are not of uniform spacing, but correspond to the log curve; the collar being provided with a straight or uniform slot following the center line 100 in Fig. 5.

These graduations are illustrated between 100 and 1,000 feet only in Fig. 6, but the same graduations would appear between 1,000 and 10,000, and also between 10,000 and 100,000, and would represent greater distances accordingly. They would be as follows:

| | | | |
|---|---|---|---|
| 100 ft. to | 300 ft. by | 5 ft. | graduations |
| 300 ft. to | 600 ft. by | 10 ft. | graduations |
| 600 ft. to | 1,000 ft. by | 20 ft. | graduations |
| 1,000 ft. to | 3,000 ft. by | 50 ft. | graduations |
| 3,000 ft. to | 6,000 ft. by | 100 ft. | graduations |
| 6,000 ft. to | 10,000 ft. to | 200 ft. | graduations |
| 10,000 ft. to | 30,000 ft. by | 500 ft. | graduations |
| 30,000 ft. to | 60,000 ft. by | 1,000 ft. | graduations |
| 60,000 ft. to | 100,000 ft. by | 2,000 ft. | graduations |

The construction of this larger instrument would be the same construction as illustrated in Fig. 2, except that it would be larger.

It is also envisaged as a possibility to construct the sleeve 27 in the form of a drum, substantially larger than tube 10, and having the collars 28 and 28' of the same size as this drum. In such a case, the slot 26 would be a straight thread slot, and the graduations could conform to the scale illustrated in Fig. 6, but instead of reading 100 feet to 300 feet 5 feet graduations, it would read 1 foot to 30 feet by .5 (½) foot graduations, etc., according to the following:

| | | | |
|---|---|---|---|
| 1 ft. to | 30 ft. by | .5 (½) | graduations |
| 30 ft. to | 60 ft. by | 1 ft. | graduations |
| 60 ft. to | 100 ft. by | 2 ft. | graduations |
| 100 ft. to | 300 ft. by | 5 ft. | graduations |
| 300 ft. to | 600 ft. by | 10 ft. | graduations |
| 600 ft. to | 1,000 ft. by | 20 ft. | graduations |
| 1,000 ft. to | 3,000 ft. by | 50 ft. | graduations |
| 3,000 ft. to | 6,000 ft. by | 100 ft. | graduations |
| 6,000 ft. to | 10,000 ft. by | 200 ft. | graduations |

It is thought that this construction as just described would undoubtedly be of greater accuracy and of greater speed in operation.

It is also possible to construct the eye piece 38 horizontally, as well as vertically, as seen in Fig. 4, or it might be so constructed as to rotate to either a vertical or horizontal position. This horizontal position of the eye piece 38 is of importance, because of the ease of operation when sighting upon a vertical object, such as a telegraph pole, wherein the object would appear as a horizontally split or divided image, the upper and lower halves being brought into alinement, registration, or made to coincide, by adjustment of the sleeve 27. It is obvious that the ocular prism must face the eye piece in its horizontal position, as well as in the vertical position, and in the case of the adjustable eye piece, it also must be moved with the eye piece.

Having thus described my invention, what I claim as new therein and desire to secure by Letters Patent is:

1. An instrument of the character described, comprising a horizontal range finder tube, means mounting the tube for axial rotation, means for focusing the range finder on an object sighted upon, and means coacting therewith for indicating the straight line distance to the object, an arcuate member rotatable with the tube, a relatively stationary arcuate member coacting therewith and provided with spaced marked members, sets of calibrations on the rotatable member so formed that readings, as determined by their positions relative to corresponding marked members of the stationary arcuate member will indicate respectively as percentages of the straight line distance, the correction to be made in the straight line distance to obtain the horizontal and vertical distances to the object.

2. In combination, a range finder of the split image type comprising a horizontal range finder tube equipped at its opposite ends with a double telescope system, and having an intermediate eye-piece, a focusing lens system, coacting distance calibrated and marked means relatively movable to adjust said lens system for focusing the instrument on an object sighted upon and for designating the straight line distance to the object as the hypotenuse of a right angle triangle having vertical and horizontal legs, a mounting for the range finder tube wherein it is rotatably adjustable about its axis for sighting objects above or below the horizontal level of the tube, an arcuate member rotatably adjustable with the tube and equipped with two sets of calibrations, a relatively stationary member having marks thereon coacting respectively with the sets of calibrations; said sets of calibrations being such that a reading thereof as determined by the positions of the corresponding marks relative thereto will indicate respectively as certain percentages of the straight line distance, the corrections to be made in the straight line distance as determined by the range finder mechanism, to determine the length of the horizontal leg and height of the vertical leg of said triangle.

3. A device as in claim 2 wherein the coacting distance calibrated means for focusing the instrument by bringing the parts of the split image of the object sighted upon into coincidence, comprises a sleeve rotatable fitted about the tube, operatively connected with the focusing lens, and equipped with a circumferentially directed, graduated scale, movable past the marked means to indicate by reference to the mark, the straight line distance to the object sighted upon.

CLAUDE L. MILLER.